US009223377B1

(12) United States Patent
Nachum

(10) Patent No.: US 9,223,377 B1

(45) Date of Patent: Dec. 29, 2015

(54) METHOD AND APPARATUS FOR POWER REDUCTION IN NETWORK

(75) Inventor: Gai Nachum, Rishon le zion (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 326 days.

(21) Appl. No.: 13/103,524

(22) Filed: May 9, 2011

Related U.S. Application Data

(60) Provisional application No. 61/333,536, filed on May 11, 2010.

(51) Int. Cl.
*G06F 1/26* (2006.01)
*G06F 1/32* (2006.01)

(52) U.S. Cl.
CPC .................................... *G06F 1/3203* (2013.01)

(58) Field of Classification Search
USPC ......... 713/320, 321, 322, 323, 324, 1, 2, 100, 713/300, 310, 330, 340, 375
See application file for complete search history.

(56) References Cited

U.S. PATENT DOCUMENTS

| | | | | |
|---|---|---|---|---|
| 6,584,330 | B1 * | 6/2003 | Ruuska | 455/574 |
| 6,604,201 | B1 * | 8/2003 | Takahashi et al. | 713/323 |
| 6,845,131 | B1 * | 1/2005 | Ward et al. | 375/295 |
| 7,426,597 | B1 * | 9/2008 | Tsu et al. | 710/307 |
| 8,340,111 | B1 * | 12/2012 | Krivitski et al. | 370/419 |
| 8,397,092 | B2 * | 3/2013 | Karnowski | 713/324 |
| 2007/0201380 | A1 * | 8/2007 | Ma et al. | 370/254 |
| 2009/0003229 | A1 * | 1/2009 | Loh et al. | 370/252 |

* cited by examiner

*Primary Examiner* — Kim Huynh
*Assistant Examiner* — Paul J Yen

(57) ABSTRACT

Aspects of the disclosure provide a network device. The network device includes a plurality of ports configured as a link to another network device. At least a first port of the plurality of ports is a power saving port configured to enter a power saving mode when traffic to be transmitted on the power saving port falls below a threshold traffic volume and at least a second port of the plurality of ports is a non-power saving port. Further, the network device includes a traffic monitor configured to monitor a volume of traffic transmitted over the plurality of ports, and a controller in communication with the traffic monitor. The controller is configured to reduce, as a function of the volume of traffic to be transmitted over the plurality of ports, a number of power saving ports in use for transmitting the traffic to the other network device.

21 Claims, 5 Drawing Sheets

METHOD AND APPARATUS FOR POWER REDUCTION IN NETWORK

INCORPORATION BY REFERENCE

This application claims the benefit of U.S. Provisional Application No. 61/333,536, "Energy Efficient Ethernet Lag" filed on May 11, 2010, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Network devices may have significant power consumption. For numerous reasons, it is typically desirable to reduce the power consumption of the network devices.

SUMMARY

Aspects of the disclosure provide a network device. The network device includes a plurality of ports configured as a link to another network device. At least a first port of the plurality of ports is a power saving port configured to enter a power saving mode when traffic to be transmitted on the power saving port falls below a threshold traffic volume and at least a second port of the plurality of ports is a non-power saving port. Further, the network device includes a traffic monitor configured to monitor a volume of traffic transmitted over the plurality of ports, and a controller in communication with the traffic monitor. The controller is configured to reduce, as a function of the volume of traffic to be transmitted over the plurality of ports, a number of power saving ports in use for transmitting the traffic to the other network device.

In an embodiment, the controller is configured to decide which ports among the plurality of ports to use based on a cost function that associates ports in the link with the traffic volume and power saving configurations of the ports. In an example, the controller is configured to distribute the traffic to non-power saving ports that are sufficient to accommodate the traffic, and use the power saving ports only when the traffic volume exceeds a threshold.

In an embodiment, the controller is configured to prioritize non-power saving ports for transmitting the traffic to the other network device so as to reduce the number of the power saving ports in use for transmitting the traffic to the other network device.

According to an aspect of the disclosure, the power saving mode is at least one of a sleep mode, a turn-off mode, a reduced voltage mode, and a reduced frequency mode.

In an example, at least one of the power saving ports is configured according to an Energy Efficient Ethernet standard and is coupled to a port in the other network device that is configured according to the Energy Efficient Ethernet standard. In another example, the power saving port is configured to disable a transmitting portion when the power saving port enters the power saving mode.

In an embodiment, the plurality of ports is coupled to a link aggregation group (LAG) that links the network device and the other network device. The controller is configured to store power configurations of link members in the LAG in association with the plurality of ports, and distribute the traffic to the plurality of ports based on the power configurations. Further, the controller is configured to monitor a power configuration change to the link members of the LAG, and update the stored power configurations according to the power configuration change.

According to an embodiment of the disclosure, the traffic monitor is configured to monitor at least one of actual traffic transmitted, estimation of traffic to be transmitted, and a fullness status of a buffer associated with one or more ports.

Aspects of the disclosure provide a method for reducing power consumption in a network device. The method includes monitoring a volume of traffic transmitted over a plurality of ports configured as a link to another network device. At least a first port of the plurality of ports is a power saving port configured to enter a power saving mode when traffic on the power saving port falls below a threshold traffic volume and at least a second port of the plurality of ports is a non-power saving port. Further, the method includes reducing, as a function of the volume of traffic over the plurality of ports, a number of power saving ports in use for transmitting the traffic to the other network device, and causing the power saving ports without outgoing traffic to enter the power saving mode.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
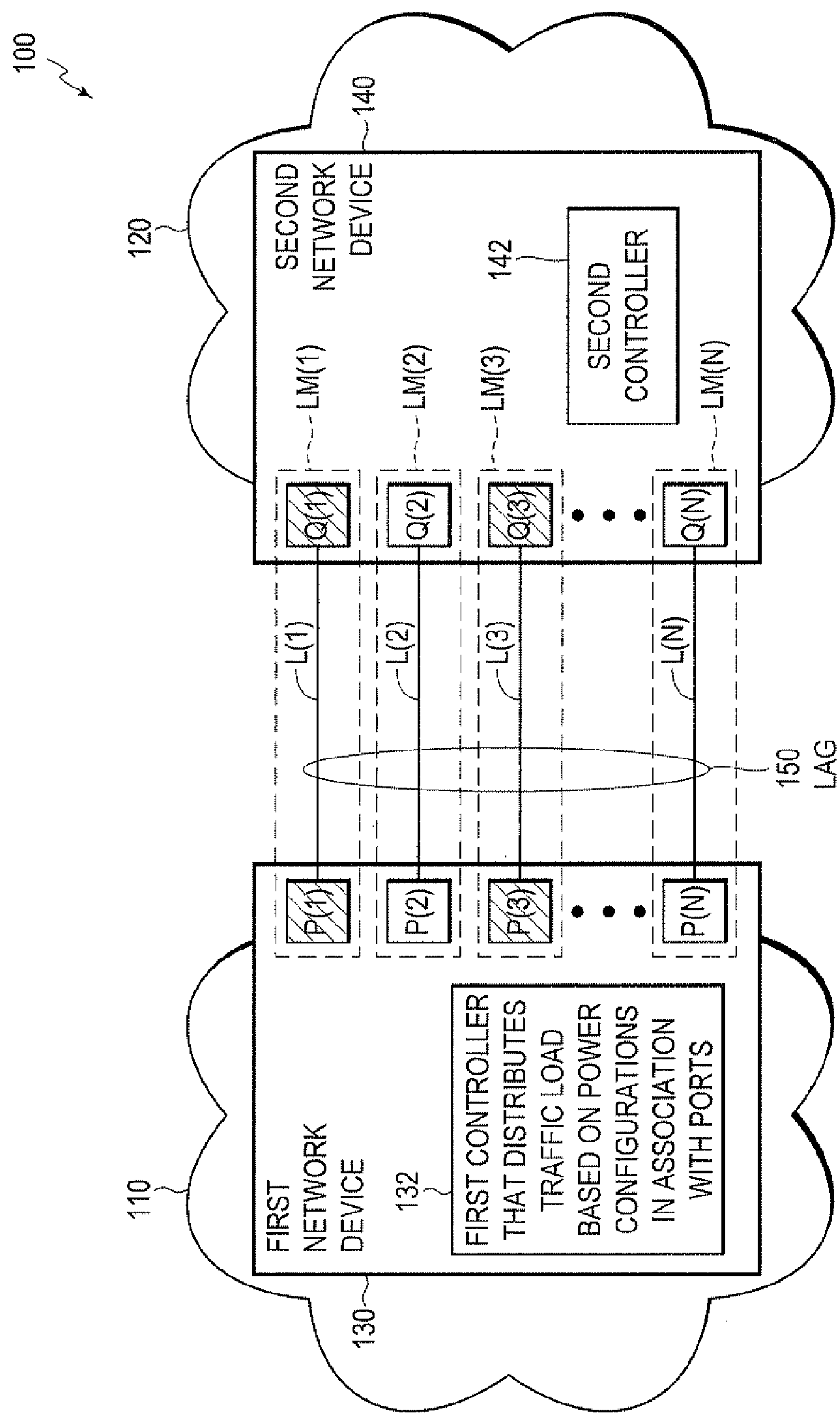
FIG. 1 shows a block diagram of a system example 100 according to an embodiment of the disclosure.

FIG. 1 shows a block diagram of a network system example 100 according to an embodiment of the disclosure. The system 100 includes a first node 110 and a second node 120. The first node 110 includes a first network switch 130, and the second node 120 includes a second network switch 140. The first network device 130 and the second network device 140 are coupled together by multiple links L(1)-L(N) (N is a positive integer that is greater than one). In an embodiment, traffic load to be transmitted is suitably distributed among the links L(1)-L(N) based at least in part on power configurations of different components within the first network device 130 and/or the second network device 140 that are in association with the links L(1)-L(N), such that a power consumption of the system 100 is reduced. It is noted that the network devices 130 and 140 can be any suitable network device, such as network switch, network bridge, and the like.

Specifically, in an embodiment, the first network device 130 includes N ports P(1)-P(N), and the second network device 140 also includes N ports Q(1)-Q(N). The ports P(1)-P(N) are respectively coupled to the ports Q(1)-Q(N) by the links L(1)-L(N). In an embodiment, the links L(1)-L(N) are grouped together to form a link aggregation group (LAG) 150 to increase bandwidth between the first node 110 and the second node 120. In the FIG. 1 example, each link and the coupled ports form a link member. Each link member has a bandwidth. For example, the link L(1) and the coupled ports P(1) and Q(1) form a link member LM(1). In the example, the hardware of the LM(1) supports 1 Gbps bandwidth. The bandwidth of the LAG 150 is a sum of all the bandwidths of the link members LM(1)-LM(N).

According to an aspect of the disclosure, a port, such as one of P(1)-P(4) and Q(1)-Q(4), can have a power configuration, such as a single power mode configuration, a power saving mode-enabled configuration, and the like. In an example, a port has a single power mode configuration that the port is always in a regular operating mode. In another example, a port has a power saving mode-enabled configuration that the port can be selectively configured in a regular operating mode, and a power saving mode, such as a power-off mode, a sleep mode, a reduced voltage mode, a reduced frequency mode, and the like, that has a reduced power consumption. For example, when a port enters a sleep mode, hardware components of the port are powered off most of the time, and are powered on periodically for a short time in order to save power. In another example, when a port enters a reduced frequency mode, for example when the full transmit capability of the port is not required, a transmitting portion of the port operates at a reduced frequency, such as one tenth of a regular frequency, to save power.

According to another aspect of the disclosure, a link member, such as the link members LM(1)-LM(N), can have a power configuration, such as a single power mode configuration, a power saving mode-enabled configuration, and the like. In an embodiment, a power configuration of a link member depends on the power configurations of both ports in the link member. In an example, both P(1) and Q(1) are Ethernet ports that support a power saving feature, such as an Energy Efficient Ethernet standard (802.3az), and the like. When the link L(1) couples P(1) and Q(1) together, the link member LM(l) has a power saving mode-enabled configuration.

In another example, P(2) is an Ethernet port that supports the Energy Efficient Ethernet standard. However, Q(2) is an always-on Ethernet that does not support the Energy Efficient Ethernet standard. When the link L(2) couples P(2) and Q(2) together, the link member LM(2) has a single power mode configuration.

According to an aspect of the disclosure, traffic load to be transmitted is distributed over the link members LM(1)-LM (N) as a function of the respective power configurations of the ports and/or the power configuration of the link members LM(1)-LM(N), in order to reduce power consumptions in the system 100.

In an embodiment, the first network device 130 includes a first controller 132 that distributes traffic load to be transmitted from the first network device 130 to the second network device 140, and the second network device 140 includes a second controller 142 that distributes traffic load to be transmitted from the second network device 140 to the first network device 130. At least one of the first controller 132 and the second controller 142 is configured to distribute the transmit traffic load as a function of the power configurations of the ports and/or the power configurations of the link members LM(1)-LM(N) to reduce power consumption in the system 100. For example, distribution of traffic among the link members is determined on the basis of a cost function that is applicable to ports and/or link members in the aggregated link.

In the FIG. 1 example, the first controller 132 is configured to distribute traffic load to be transmitted to the second network device 140 based on power configurations of the link members LM(1)-LM(N) to reduce power consumption in the system 100. Specifically, in an embodiment, the first controller 132 obtains and stores power configurations of the link members LM(1)-LM(N), and distributes the traffic load to be transmitted based on the stored power configurations so as to optimize the ability of ports which have a power saving capability to save power without significantly compromising the transmission of traffic from the network device 130 to the network device 140.

In an example, when a port in the first network device 130, such as P(1), and a port in the second network device 140, such as Q(1) are coupled together, and are powered up, P(1) and Q(1) suitably communicate with each other to exchange information. For example, P(1) receives information about Q(1) that indicates that Q(1) is an Ethernet that supports the Energy Efficient Ethernet standard. When P(1) is also an Ethernet that supports the Energy Efficient Ethernet standard, the first controller 132 stores a power configuration, such as a power saving mode-enabled configuration, and the like, in association with P(1), for example. In an embodiment, the power configuration is used to reduce power by transmitting traffic over ports other than P(1), when this is possible. In an example, the first controller 132 determines traffic load distribution on the basis of a cost function. The power configurations of the ports are included in the cost function, and are a part of the cost function. Thus, the traffic load distribution is a function of the power saving capabilities of the ports.

In another example, when P(2) and Q(2) are coupled together, and are powered up, P(2) and Q(2) suitably communicate with each other to exchange information. For example, P(2) receives information about Q(2) that indicates Q(2) is an always-on Ethernet that does not support the Energy Efficient Ethernet standard. Even though P(2) is an Ethernet port that supports the Energy Efficient Ethernet standard, the first controller 132 stores a power configuration, such as a single power mode configuration, and the like, in association with P(2), for example.

It is noted that the first controller 132 can update the power configurations when a change happens. For example, when P(2) is decoupled from Q(2), and is coupled to another port (not shown) that supports the Energy Efficient Ethernet standard, the first controller 132 updates the power configuration in association with P(2) to a power saving mode-enabled configuration. In an embodiment, when the power configuration in association with a port is changed or updated, the cost function used to distribute traffic load is also updated.

It is also noted that the first controller 132 can also store other information about the link members LM(1)-LM(N). In an embodiment, the first controller 132 also stores bandwidths for the link members LM(1)-LM(N). In an example, the first controller 132 stores a bandwidth of the link member in association with a port of the link member. It is noted that a link member bandwidth can be different from a port bandwidth. In an example, a link member bandwidth depends on bandwidths of both ports of the link member. When the two ports support different bandwidths, the link member bandwidth is equal to or smaller than the smaller bandwidth. In an embodiment, the cost function for traffic load distribution also includes the bandwidths of the link members as factors for making decision.

Further, the first controller 132 distributes among link members the traffic to be transmitted to the second network device 140 based on the stored power configurations so as to minimize power consumption in the system 100. According to an aspect of the disclosure, the first controller 132 distributes the traffic to minimize usage of the link members that have the power saving mode-enabled configuration such that when traffic drops below a threshold, link members that operate at a higher level of power consumption will be preferred.

It is noted that there may be one or more thresholds based on respective power configurations of the different links.

In an embodiment, the first controller 132 prioritizes the link members that have the single power mode configuration for the traffic. For example, when the traffic to the second network device 140 is 1 Gpbs, and the bandwidth in association with P(2) is 1 Gbps, the first controller 132 distributes the whole traffic to P(2). In another example, both P(2) and P(3) have the single power mode configuration. The first controller 132 distributes the traffic evenly to P(2) and P(3).

In another embodiment, when the traffic load to be transmitted is larger than a sum bandwidth of the link members that have the single power mode configuration, the first controller 132 starts to distribute the traffic to the link members that have the power-saving mode-enabled configuration. In an example, the first controller 132 distributes the traffic in a manner to minimize the usage of the link members that have the power saving mode-enabled configuration, such that a relatively large number of the link members enter the suitable power saving mode to save power.

In an embodiment, the second controller 142 is a controller that distributes traffic going to the first network device 130 based on power configurations of the link members LM(1)-LM(N). It is noted that, in another embodiment, the second controller 142 can distribute traffic to the first network device 130 using other suitable method, such as even distribution, and the like. In an example, the second controller 142 determines traffic load distribution on the basis of a cost function. The power configurations of the ports are included in the cost function, and are a part of the cost function. Thus, the traffic load distribution is a function of the power saving capabilities of the ports.

It is noted that in the FIG. 1 example, P(1)-P(N) are ports of the first network device 130, and the Q(1)-Q(N) are ports of the second network device 140. However, in another example, P(1)-P(N) are ports of multiple network devices that are aggregated to form the first network node 110. Then, the first controller 132 can be a controller in any of the multiple network devices, or can be a controller in a separate device from the multiple network devices. Similarly, Q(1)-Q(N) can be ports of different network devices that are aggregated to form the second network node 120.

It is also noted that, in an embodiment, the first controller 132 can be configured to distribute traffic to the second network device 140 based on power configurations of the ports P(1)-P(N). In an example, the power modes of the P(1)-P(N) are independent of Q(1)-Q(N). For example, when P(2) does not have outgoing traffic, P(2) enters a power saving mode no matter Q(2) supports the power saving mode or not. Then, the first controller 132 distributes traffic to the second network device 140 based on power configurations of the ports P(1)-P(N) to cause the first network device 130 to have reduced power consumption. In another example, the power modes of the P(1)-P(N) depend on Q(1)-Q(N). Then, for P(2) to enter a power saving mode, Q(2) has to support the power saving mode (even if not active). Thus, in an example, the power configuration in association with P(2) is a collective power configuration of both P(2) and Q(2).

It is also noted that in an embodiment, a link member, such as LM(1), can have a non-zero bandwidth in a power saving mode. Then, the first controller 132 is configured to limit the traffic distribution for the LM(1) not to exceed the non-zero bandwidth, such that the LM(1) is able to enter the power saving mode.

It is noted that, in an embodiment, each of the link members LM(1)-LM(N) has its own power and bandwidth configurations. Each link member has a plurality of bandwidths in association with a plurality of power consumption levels. For example, LM(1) has 1 Gbps in association with one power unit, and zero bandwidth in association with zero power unit. LM(2) has 1 Gbps in association with one power unit, 100 Mbps in association with half power unit, and zero bandwidth in association with zero power unit. The plurality of bandwidths associated with the plurality of power consumption levels is stored in association with a port of the link member in the first network device 130. The first controller 132 suitably distributes the traffic load to be transmitted to the ports P(1)-P(N) based on the bandwidths in association with the power consumption levels for the link members, such that the ports are able to transmit the traffic load to be transmitted and the total power consumption of the first network device 130 is minimized.

It is noted that, in an embodiment, the first network device 130 includes traffic monitor (not shown) configured to monitor traffic to the second network device 140. In an example, the traffic monitor is configured to monitor actual traffic transmitted by the ports P(1) to P(N). In another example, the traffic monitor is configured to estimate traffic to be transmitted by the ports P(1) to P(N). In another example, the traffic monitor is configured to monitor a fullness status of one or more buffers associated with the ports P(1) to P(N).

Figure 2A:
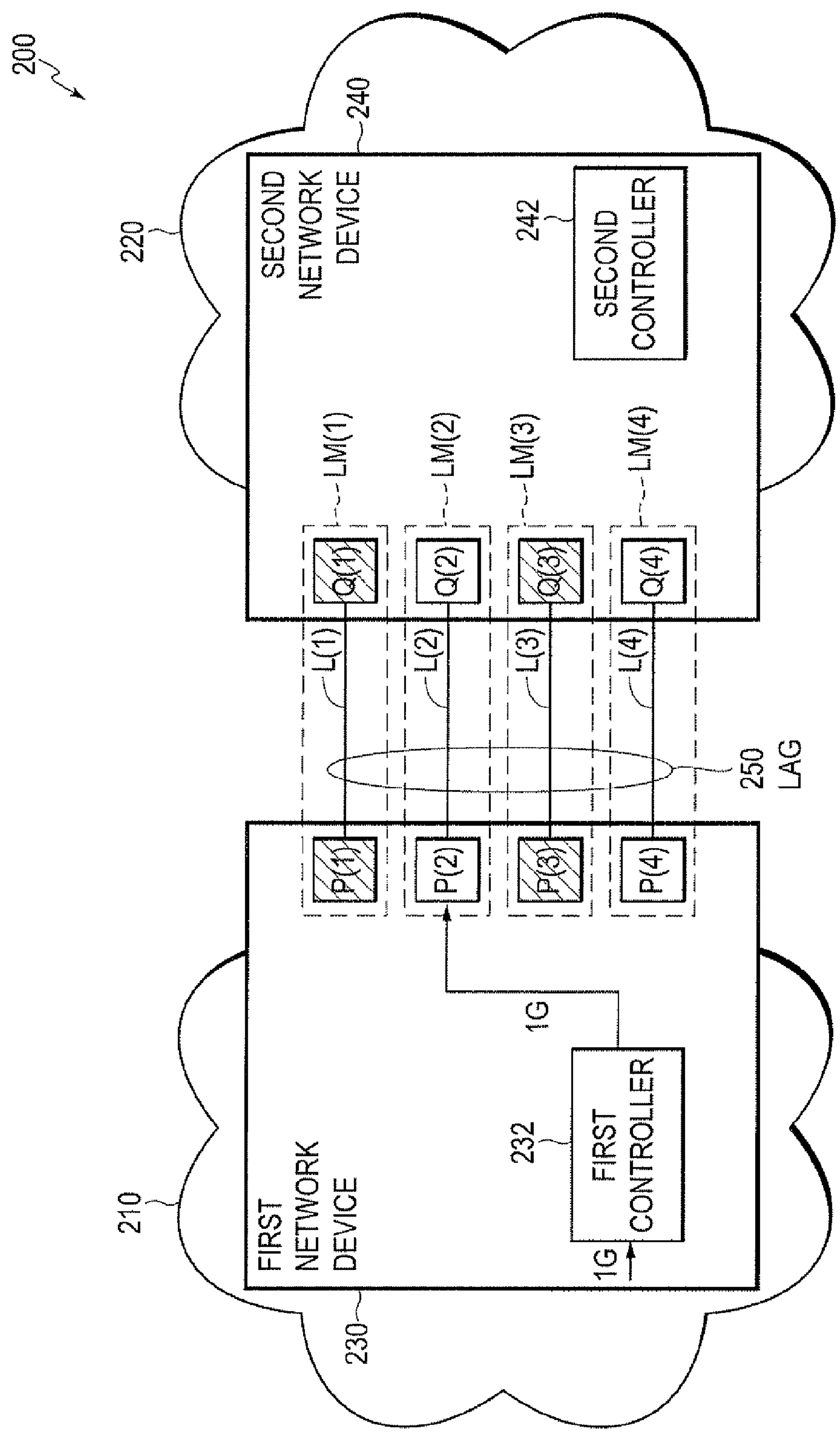
FIGS. 2A-2C show block diagrams of a system example 200 having different traffic load to be transmitted according to an embodiment of the disclosure.
Figure 2B:
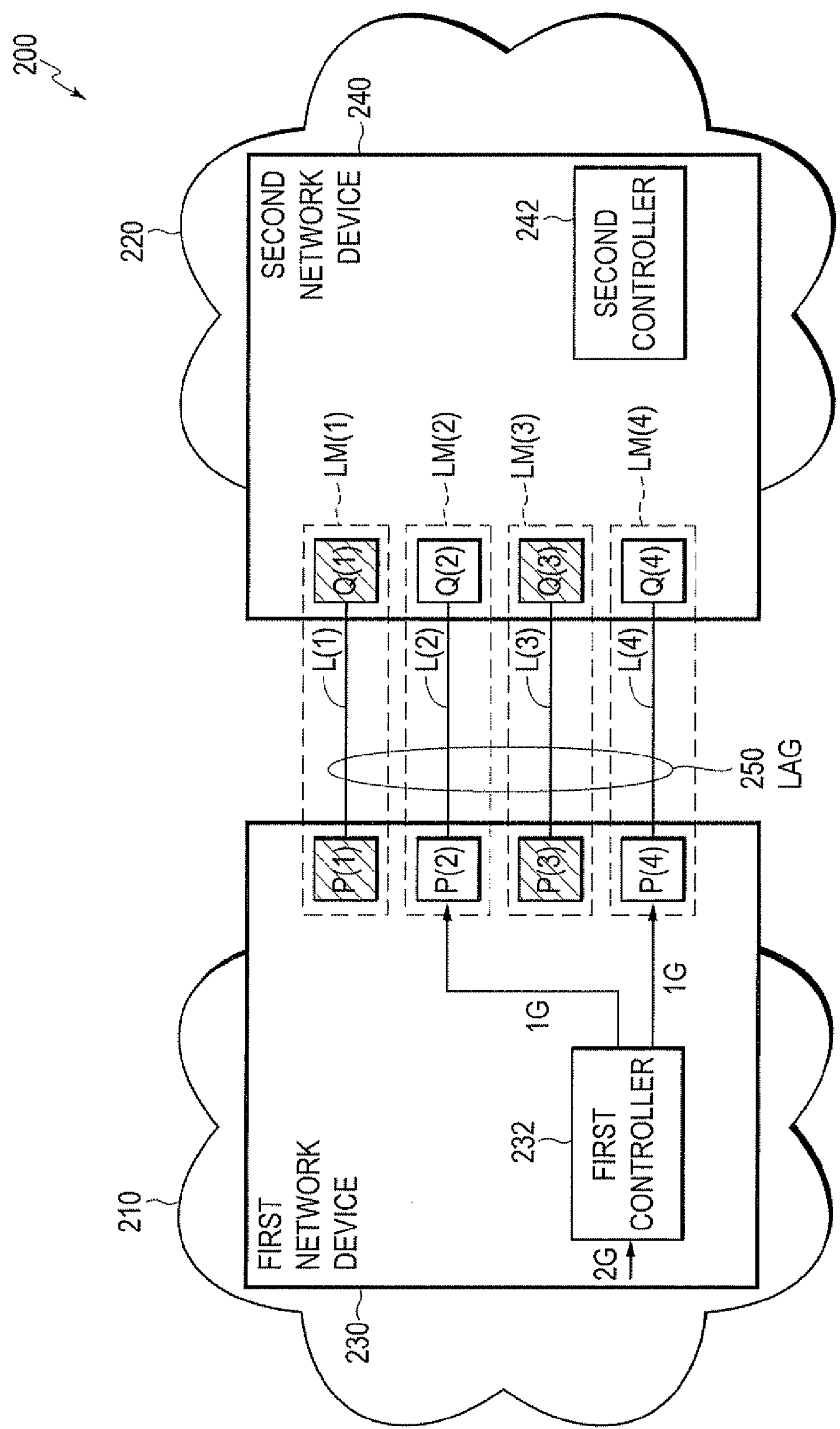
Figure 2C:
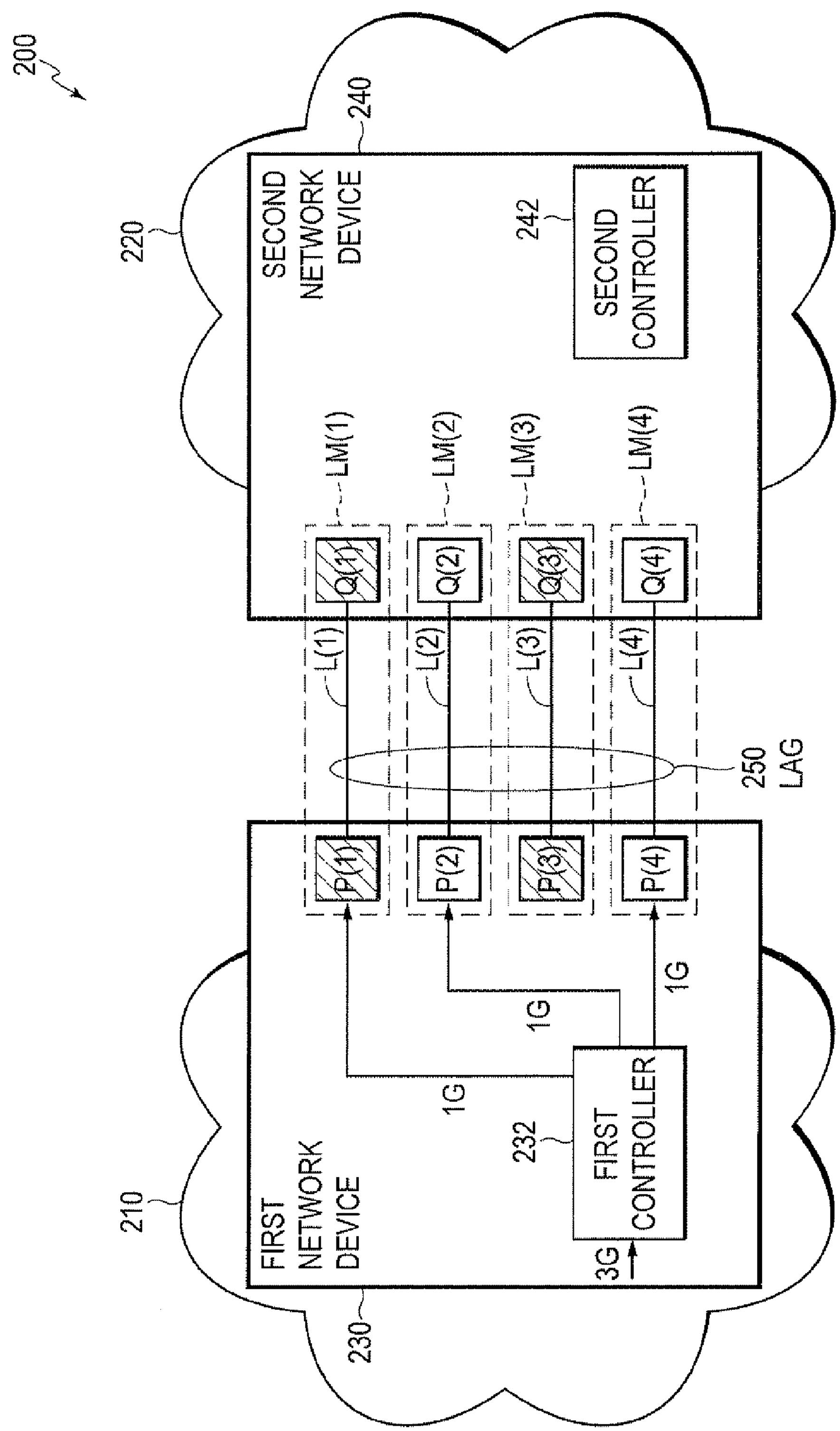

FIGS. 2A-2C show block diagrams of a system example 200 having different traffic load to be transmitted according to an embodiment of the disclosure. The system 200 includes a first node 210 and a second node 220. The first node 210 includes a first network device 230, and the second node 220 includes a second network device 240. The first network device 230 includes four ports P(1)-P(4), and the second network device 240 includes four ports Q(1)-Q(4). The ports P(1)-P(4) are respectively coupled to the ports Q(1)-Q(4) by links L(1)-L(4) to form four link members LM(l)-LM(4). It is noted that the network devices 230 and 240 can be any suitable network device, such as network switch, network bridge, and the like.

In an embodiment, the links L(1)-L(4) are grouped together to form a link aggregation group (LAG) 250 to increase bandwidth between the first node 210 and the second node 220. Specifically, the four ports PM-P(4) form a first logical port in the first network device 230; and the four ports Q1-Q(4) form a second logical port in the second network device 240. The LAG 250 couples the first logical port with the second logical port. The bandwidth of the LAG 250 is a sum of the bandwidth of the link members LM(1)-LM(4). In the FIGS. 2A-2C example, each of the link members LM(1)-LM(4) has 1 Gbps bandwidth. The LAG 250 has 4 Gbps bandwidth.

Further, the first network device 230 includes a first controller 232 that distributes traffic load that goes from the first network device 230 to the second network device 240 over the link members LM(1)-LM(4), and the second network device 240 includes a second controller 242 that distributes traffic load that goes from the second network device 240 to the first network device 230 over the link members LM(1)-LM(4). In the FIGS. 2A-2C, the first controller 232 is configured to distribute the traffic load among the link members LM(1)-LM(4) based on the power configurations of the respective link members LM(1)-LM(4) to reduce power consumption in the system 200 without significantly impacting on the ability of LAG 250 to carry a traffic load at a given time.

In the FIGS. 2A-2C, LM(1) and LM(3) are link members that have a power saving mode-enabled configuration, and LM(2) and LM(4) are link members that have a single power mode configuration. In an example, P(1), P(3), Q(1), and Q(3) are Ethernet ports that support Energy Efficient Ethernet standard (802.3az). Accordingly, in an example, each port of P(1), P(3), Q(1) and Q(3) automatically disables a transmitting portion to reduce power consumption when no traffic load is distributed to the port.

For ease and clarity, in an example, a port is assumed to consume one power unit when the port is in a regular operating mode, and is assumed to consume half power unit when the port is in a power saving mode.

In the FIG. 2A example, the system 200 has 1 Gbps traffic load from the first network device 230 to the second network device 240. The first controller 232 distributes the traffic load to P(2) and/or P(4). In an example, the first controller 232 distributes the 1 Gbps traffic load to P(2). In this example, because P(2) and P(4) have the single power mode configuration, and thus are always in the regular operating mode. P(2) and P(4) consume two power units. Further, P(1) and P(3) do not have outgoing traffic, and thus enter the power saving mode. In the power saving mode, P(1) and P(3) respectively disable their transmitting portions to save power, thus each of P(1) and P(3) consumes half power unit. In total, the first network device 230 consumes three power units.

In a comparison example, when the 1 Gbps traffic load is evenly distributed to P(1)-P(4), P(1)-P(4) are in the regular operating mode. Thus, the first network device 230 consumes four power units in total.

In the FIG. 2B example, the system 200 has 2 Gbps traffic load from the first network device 230 to the second network device 240. The first controller 232 distributes the traffic load to P(2) and P(4). In this example, because P(2) and P(4) have the single power mode configuration, and thus are always in the regular operation mode. P(2) and P(4) consume two power units. Further, P(1) and P(3) do not have outgoing traffic, and thus enter the power saving mode. In the power saving mode, P(1) and P(3) respectively disable their transmitting portions to save power, thus each of P(1) and P(3) consumes half power unit. In total, the first network device 230 consumes three power units.

In a comparison example, when the 2 Gbps traffic load is evenly distributed to P(1)-P(4), P(1)-P(4) are in the regular operating mode. Thus, the first network device 230 consumes four power units in total.

In the FIG. 2C example, the system 200 has 3 Gbps traffic load from the first network device 230 to the second network device 240. The first controller 232 distributes the traffic to P(1), P(2) and P(4). In this example, because P(2) and P(4) have the single power mode configuration, and thus are always in the regular operation mode. P(2) and P(4) consume 2 power units. Further, P(1) has outgoing traffic and is in the regular operation mode, P(1) consumes 1 power unit. P(3) does not have outgoing traffic, and thus enter the power saving mode. In the power saving mode, P(3) disables its transmitting portion to save power, thus P(3) consumes half power unit. In total, the first network device 230 consumes three and half power units.

In a comparison example, when the 3 Gbps traffic load is evenly distributed to P(1)-P(4), P(1)-P(4) are in the regular operating mode. Thus, the first network device 230 consumes four power units in total.

Figure 3:
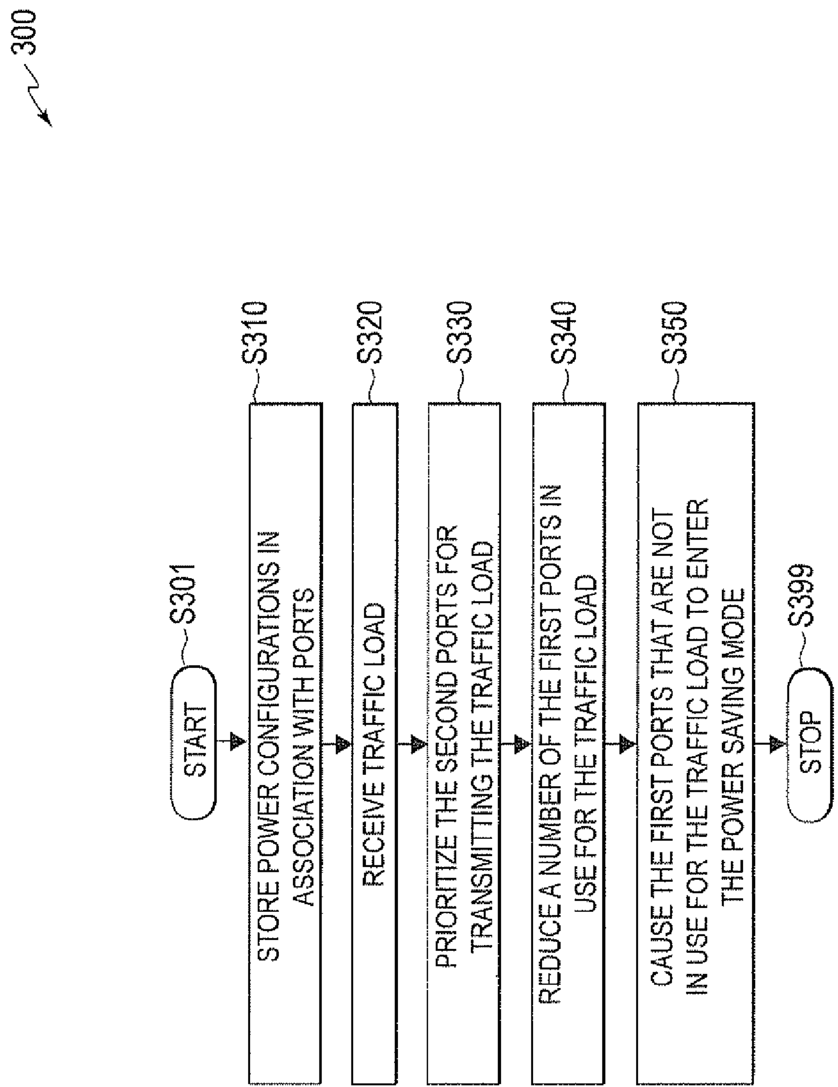
FIG. 3 shows a flow chart outlining a process example 300 for distributing traffic load to be transmitted according to an embodiment of the disclosure.

FIG. 3 shows a flow chart outlining a process example 300 for traffic load distribution over a LAG, such as the LAG 150 and the LAG 250, according to an embodiment of the disclosure. In an example, the LAG couples a first network device with a second network device, and the traffic load is from the first network device to the second network device. It is noted that the first network device and the second network device can be any suitable network device, such as network switch, network bridge, and the like.

Specifically, the LAG includes multiple links. Each link couples a port in the first network device and a port in the second network device. The link and corresponding ports form a link member. In an embodiment, the bandwidth and the power configuration of the link member depends on both the port in the first network device and the port in the second network device. In an example, a link member can have a single power mode configuration and can have a power saving mode-enabled configuration. The first network device includes a first controller that distributes the traffic load to the second network device over the LAG in a manner to reduce power consumption in the first network device. The process starts at S301, and proceeds to S310.

At S310, the first controller stores power configurations in association with ports. In an example, the first controller 232 associates a power saving mode-enabled configuration with first ports belonging to the link members that can be configured into the power saving mode, and associates the single power mode configuration with second ports belonging to the link members that are always in the regular operating mode. In an embodiment, when a port in the first network device and a port in the second network device are coupled together to form a link member that joins the LAG, the ports suitably communicate with each other to exchange information to determine, for example, the power configuration and the bandwidth of the link member. Then, the first controller stores the determined power configuration and the bandwidth in association with the port in the first network device.

At S320, the first network device receives the traffic load for transmitting to the second network device.

At S330, the first controller prioritizes the second ports for transmitting the traffic load to the second network device. In an example, the first controller distributes the traffic load to the second ports until all the second ports transmit at the full bandwidths of the corresponding link members. Thus, when the traffic load is smaller than a sum of the bandwidths in association with the second ports, no traffic load is distributed to the first ports. When the traffic load is larger than the sum of the bandwidths in association with the second ports, the first controller starts to distribute the traffic load to the first ports.

At S340, the first controller distributes the traffic load to the first ports in a manner to reduce a number of the first ports in use for the traffic load. For example, when the traffic load is smaller than the sum of the bandwidths in association with the second ports, no first ports are in use for the traffic load. When the traffic load is larger than the sum of the bandwidths in association with the second ports, and the second ports transmit at their full bandwidths of the corresponding link members, the rest of the traffic load is distributed to the first ports in a manner to minimize the number of the first ports in use.

At S350, the network device causes the rest of the first ports that are not in use for the traffic load to enter the power saving mode. In an example, a first port is configured to automatically enter the power saving mode when the first port does not have outgoing traffic. In another example, the first controller suitably configures a first port into the power saving mode when the first port does not have outgoing traffic. Then, the process proceeds to S399 and terminates.

It is noted that the process 300 can be suitably modified. In an example, when all the ports in the first network device have the power saving mode-enabled configuration, S330 is skipped.

While the subject matter of the present disclosure has been described in conjunction with the specific embodiments thereof that are proposed as examples, it, is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A network device, comprising:

a plurality of ports configured to provide an aggregated link to another network device, ones of the plurality of ports being respectively coupled to corresponding ones of a plurality of ports of the another network device, the respective couplings defining a plurality of selectable link members over which to communicate traffic between the network device and the another network device, wherein at least one port of the plurality of ports that are configured as the aggregated link is a power saving port having a power saving mode-enabled configuration where the port is configured to transmit traffic in a regular operating mode and further configured to enter a power saving mode to save power by consuming reduced power during operation, when traffic on the power saving port falls below a threshold traffic volume, and having a single power mode configuration where the port is configured to transmit traffic only in the regular operating mode;

a traffic monitor configured to monitor a volume of traffic transmitted over the plurality of ports; and a controller in communication with the traffic monitor, the controller configured to set a power configuration of at least one power saving port, of at least one of the plurality of selectable links, to the single power mode configuration, when the controller receives information indicating that at least one port of the another network device coupled to the at least one of the plurality of selectable links does not support the power saving mode, to select one or more ports corresponding to link members of the aggregated link over which to transmit traffic to the another network device and to avoid transmitting traffic over at least one power saving port having the power saving mode-enabled configuration among the plurality of ports that are configured as the aggregated link, enabling the at least one power saving port having the power saving mode-enabled configuration to enter into the power saving mode, when a bandwidth capacity of other ports among the plurality of ports that are configured as the aggregated link is adequate to transmit the monitored traffic volume.

2. The network device of claim 1, wherein the controller is configured to prioritize the selection ports having the single power mode configuration among the plurality of ports that are configured as the aggregated link for transmitting the traffic to the another network device so as to reduce a number of power saving ports having the power saving mode-enabled configuration among the plurality of ports that are configured as the aggregated link in use for transmitting the traffic to the another network device.

3. The network device of claim 1, wherein the at least one power saving port having the power saving mode-enabled configuration is configured according to an Energy Efficient Ethernet standard and is coupled to a port in the another network device that is configured according to the Energy Efficient Ethernet standard.

4. The network device of claim 1, wherein the at least one power saving port having the power saving mode-enabled configuration is configured to enter at least one of a sleep mode, a reduced voltage mode, and a reduced frequency mode when the traffic transmitted falls below the threshold traffic volume.

5. The network device of claim 1, wherein the at least one power saving port having the power saving mode-enabled configuration is configured to disable a transmitting portion when the power saving port enters the power saving mode.

6. The network device of claim 1, wherein the controller is configured to store power configurations of the link members of the aggregated link in association with the plurality of ports, and distribute the traffic to the plurality of ports that are configured as the aggregated link based on the power configurations.

7. The network device of claim 6, wherein the controller is configured to monitor a power configuration change to the link members of the aggregated link, and update the stored power configurations according to the power configuration change.

8. The network device of claim 1, wherein the traffic monitor is configured to monitor at least one of actual traffic transmitted, estimation of traffic to be transmitted, and a fullness status of a buffer associated with one or more ports among the plurality of ports that are configured as the aggregated link.

9. The network device of claim 1, wherein the controller is configured to decide which ports among the plurality of ports that are configured as the aggregated link to use based on a cost function that associates ports in the aggregated link with the traffic volume and power saving configurations of the ports.

10. The network device of claim 1, wherein the controller is configured to distribute the traffic to ports having the single power mode configuration among the plurality of ports that are configured as the aggregated link that are sufficient to accommodate the traffic, and use the at least one power saving port having the power saving mode-enabled configuration only when the traffic volume exceeds a threshold.

11. A method for reducing power consumption in a network device, comprising:

monitoring a volume of traffic transmitted over a plurality of ports configured to provide an aggregated link to another network device, ones of the plurality of ports being respectively coupled to corresponding ones of a plurality of ports of the another network device, the respective couplings defining a plurality of selectable link members over which to communicate traffic between the network device and the another network device, wherein at least one port of the plurality of ports that are configured as the aggregated link is a power saving port having a power saving mode-enabled configuration where the port is configured to transmit traffic in a regular operating mode and further configured to enter a power saving mode to save power by consuming reduced power during operation, when traffic on the power saving port falls below a threshold traffic volume, and having a single power mode configuration where the port is configured to transmit traffic only in the regular operating mode;

setting a power configuration of at least one power saving port, of at least one of the plurality of selectable links, to the single power mode configuration, when information indicating that at least one port of the another network device coupled to the at least one of the plurality of selectable links does not support the power saving mode is received;

selecting one or more ports corresponding to link members of the aggregated link over which to transmit traffic to the another network device;

reducing, as a function of the volume of traffic transmitted over the plurality of ports that are configured as the aggregated link, a number of power saving ports having the power saving mode-enabled configuration among the plurality of ports that are configured as the aggregated link in use for transmitting the traffic to the another network device; and causing the power saving ports having the power saving mode-enabled configuration among the plurality of ports that are configured as the aggregated link without outgoing traffic to enter the power saving mode, when ports having the single power mode configuration among the plurality of ports that are configured as the aggregated link have a capacity that is adequate for carrying the monitored traffic volume.

12. The method of claim 11, further comprising:

prioritizing the selection of ports having the single power mode configuration among the plurality of ports that are configured as the aggregated link for transmitting the traffic to the another network device in order to reduce the number of the power saving ports having the power saving mode-enabled configuration among the plurality of ports that are configured as the aggregated link in use.

13. The method of claim 11, wherein causing the power saving ports having the power saving mode-enabled configuration among the plurality of ports that are configured as the aggregated link without outgoing traffic to enter the power saving mode further comprises:

causing at least one port of the power saving ports having the power saving mode-enabled configuration among the plurality of ports that are configured as the aggregated link that is configured according to Energy Efficient Ethernet standard to not have outgoing traffic, such that the at least one port enters the power saving mode by itself.

14. The method of claim 11, wherein causing the power saving ports having the power saving mode-enabled configuration among the plurality of ports that are configured as the aggregated link without outgoing traffic to enter the power saving mode further comprises:

causing at least one port of the power saving ports having the power saving mode-enabled configuration among the plurality of ports that are configured as the aggregated link that does not have outgoing traffic to enter at least one of a sleep mode, a reduced voltage mode, and a reduced frequency mode.

15. The method of claim 11, further comprising:

storing a power configuration collectively determined by the power saving port and a corresponding coupled port of the another network device in association with the power saving port.

16. The method of claim 11, wherein monitoring the volume of traffic transmitted over the plurality of ports further comprises at least one of:

monitoring actual traffic transmitted over the plurality of ports that are configured as the aggregated link;

estimating traffic to be transmitted over the plurality of ports that are configured as the aggregated link; and monitoring a fullness status of a buffer associated with one or more ports among the plurality of ports that are configured as the aggregated link.

17. The method of claim 11, wherein reducing, as a function of the volume of traffic transmitted over the plurality of ports that are configured as the aggregated link, the number of power saving ports having the power saving mode-enabled configuration among the plurality of ports that are configured as the aggregated link in use for transmitting the traffic, further comprises:

determining which ports among the plurality of ports that are configured as the aggregated link to use based on a cost function that associates ports in the aggregated link with traffic volume and power saving configurations of the ports.

18. The method of claim 11, wherein reducing, as a function of the volume of traffic transmitted over the plurality of ports that are configured as the aggregated link, the number of power saving ports having the power saving mode-enabled configuration among the plurality of ports that are configured as the aggregated link in use for transmitting the traffic, further comprises:

distributing the traffic to ports having the single power mode configuration among the plurality of ports that are configured as the aggregated link that are sufficient to accommodate the traffic; and distributing the traffic to the power saving ports having the power saving mode-enabled configuration among the plurality of ports that are configured as the aggregated link only when the traffic volume exceeds a threshold.

19. A network device, comprising:

a plurality of ports configured to provide an aggregated link to another network device, ones of the plurality of ports being respectively coupled to corresponding ones of a plurality of ports of the another network device, the respective couplings defining a plurality of selectable link members over which to communicate traffic between the network device and the another network device, wherein the plurality of ports that are configured as the aggregated link include a power saving port having a power saving mode-enabled configuration where the port is configured to transmit traffic in a regular operating mode and further configured to enter a power saving mode to save power by consuming reduced power during operation, when traffic transmitted on the power saving port falls below a threshold traffic volume, and having a single power mode configuration where the port is configured to transmit traffic only in the regular operating mode;

a traffic monitor configured to monitor a volume of traffic transmitted over the plurality of ports; and a controller in communication with the traffic monitor, the controller configured to set a power configuration of at least one power saving port, of at least one of the plurality of selectable links, to the single power mode configuration, when the controller receives information indicating that at least one port of the another network device coupled to the at least one of the plurality of selectable links does not support the power saving mode, to select one or more ports corresponding to link members of the aggregated link over which to transmit traffic to the another network device, and to increase, as a function of the volume of traffic transmitted over the plurality of ports that are configured as the aggregated link, a number of power saving ports having the power saving mode-enabled configuration with traffic below the threshold traffic volume, when ports having the single power mode configuration among the plurality of ports that are configured as the aggregated link of the network device have a capacity that is adequate for carrying the monitored traffic.

20. The network device of claim 1, wherein an amount of power consumed by the power saving port having the power saving mode-enabled configuration transmitting in the power saving mode is less than an amount of power consumed by a port having the single power mode configuration transmitting in the regular operating mode.

21. The network device of claim 1, wherein the regular operating mode is an always power ON mode.

* * * * *